UNITED STATES PATENT OFFICE.

WILLIAM A. GILL, OF TARRYTOWN, NEW YORK, ASSIGNOR TO RENDROCK POWDER COMPANY, OF NEW YORK, N. Y.

EXPLOSIVE COMPOUND.

SPECIFICATION forming part of Letters Patent No. 683,929, dated October 8, 1901.

Application filed December 17, 1900. Serial No. 40,208. (No specimens.)

*To all whom it may concern:*

Be it known that I, WILLIAM A. GILL, of Tarrytown, in the county of Westchester and State of New York, have invented certain new and useful Improvements in Explosive Compounds, of which the following is a specification.

This invention relates to certain improvements in explosive compounds the constituent parts of which comprise a solid ingredient, such as chlorate of potash, and a liquid ingredient, such as nitrobenzol, the two said ingredients being in themselves non-explosive by percussion. These ingredients are handled and sold separately and mechanically united at their place of use substantially in the proportions of four parts of the solid ingredient to one part of the liquid ingredient.

In carrying out my invention I employ marble-dust as a portion of the solid ingredient, and preferably I substitute the marble-dust for a portion of the chlorate of potash usually employed as substantially the entire solid ingredient.

In mixing marble-dust with chlorate of potash I provide a solid ingredient which will more readily and thoroughly absorb the nitrobenzol or other liquid ingredient than will chlorate of potash by itself. For this and other reasons I find that the mixture of marble-dust and chlorate of potash gives better results than can be obtained by using the chlorate of potash alone. The mixture of marble-dust and chlorate of potash as the solid ingredient also requires a less amount of the liquid ingredient, such as nitrobenzol, than does the chlorate of potash used by itself as the solid ingredient.

In carrying out my invention the proportions which I have found hitherto as giving good results are fifty-eight per cent. of chlorate of potash, twenty-five per cent. of marble-dust, and seventeen per cent. of nitrobenzol. In preparing the compound for the market I mix three parts of the marble-dust with seven parts of chlorate of potash and inclose the same in a suitable cartridge or other receptacle. To this I add seventeen per cent. of the whole of nitrobenzol at such time and place as it is desired to use the compound.

I have found that the liquid ingredient will be readily and thoroughly absorbed by the mixture of marble-dust and chlorate of potash and that a high explosive force will be the result.

Other metallic carbonates, such as magnesium carbonate, may be substituted for the marble-dust hitherto described as employed in this compound; but I prefer to use marble-dust, as I have found that such ingredient will combine better with the chlorate of potash to absorb the nitrobenzol.

As heretofore, perchlorate or permanganate of potash may, if desired, be used instead of the chlorate of potash, and other liquid nitro compounds may be substituted for the nitrobenzol, the essential condition being observed that the liquid ingredient shall possess a degree of fluidity which shall adapt it to be readily absorbed by the solid ingredient.

In manufacturing my nitrobenzol I commonly employ naphtha of commerce, and it will therefore be understood that the nitrobenzol may contain some nitrotoluol and picric acid.

What I claim, and desire to secure by United States Letters Patent, is—

1. An absorbent for liquids in making explosives, comprising a mixture of marble-dust and chlorate of potash.

2. The explosive compound herein described which consists essentially of a mixture of marble-dust, chlorate of potash and nitrobenzol.

3. The explosive compound herein described which consists essentially of a solid ingredient composed of marble-dust and chlorate of potash, and a liquid ingredient consisting of a liquid nitro compound, mechanically united, substantially in the proportions of about five parts of the solid ingredient to one part of the liquid ingredient.

4. The explosive compound herein described which consists essentially of a solid ingredient composed of about three parts of marble-dust to seven parts of chlorate of potash, and a liquid ingredient consisting of a liquid nitro compound, mechanically united, substantially in the proportions of five parts of the solid ingredient to one part of the liquid ingredient.

5. The explosive compound herein described which consists essentially of a mixture of chlorate of potash, marble-dust, and nitrobenzol, substantially in the proportions of fifty-eight per cent. of chlorate of potash, twenty-five per cent. of marble-dust, and seventeen per cent. of nitrobenzol.

WILLIAM A. GILL.

Witnesses:
JOHN H. MURRAY,
JOHN H. FISHER.